Oct. 11, 1960 A. W. WALLENS ET AL 2,956,270

TAPE STORAGE APPARATUS

Filed Oct. 31, 1958 2 Sheets-Sheet 1

FIG. I.

Inventors
A.W. WALLENS -
B.W. EVERSHED
By
Attorney

Inventors
A.W. WALLENS -
B.W. EVERSHED
By [signature]
Attorney

United States Patent Office 2,956,270

Patented Oct. 11, 1960

2,956,270

TAPE STORAGE APPARATUS

Anthony Walter Wallens and Bryan William Evershed, Croydon, England, assignors to Creed & Company Limited, Croydon, England, a British company Filed Oct. 31, 1958, Ser. No. 771,015

Claims priority, application Great Britain Nov. 12, 1957

4 Claims. (Cl. 340—259)

This invention relates to tape storage apparatus and, more particularly, to means for indicating when a certain amount of tape has been stored in such apparatus.

There are many types of system in which information is recorded on a tape, for example by perforating a paper tape, and the tape has to be stored before being fed to a further stage in the system. It is essential that during the period of storage the tape should not become torn, creased or otherwise mutilated. In order to prevent any mutilation of the tape it is preferable to provide a storage container in which the folds of the tape cannot overlap and become entangled. A storage means of this character is described and claimed in British Specification No. 685,067. It is also known to provide a differential counter which indicates the number of characters or messages within the container at any time.

According to the present invention it is proposed to provide tape storage apparatus in which an indication is given when the pressure required to feed further tape into the container reaches a predetermined value.

Figure 1:
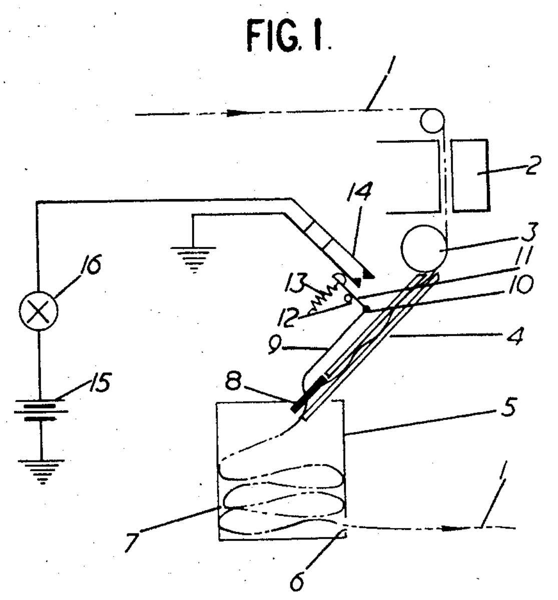
Figure 2:
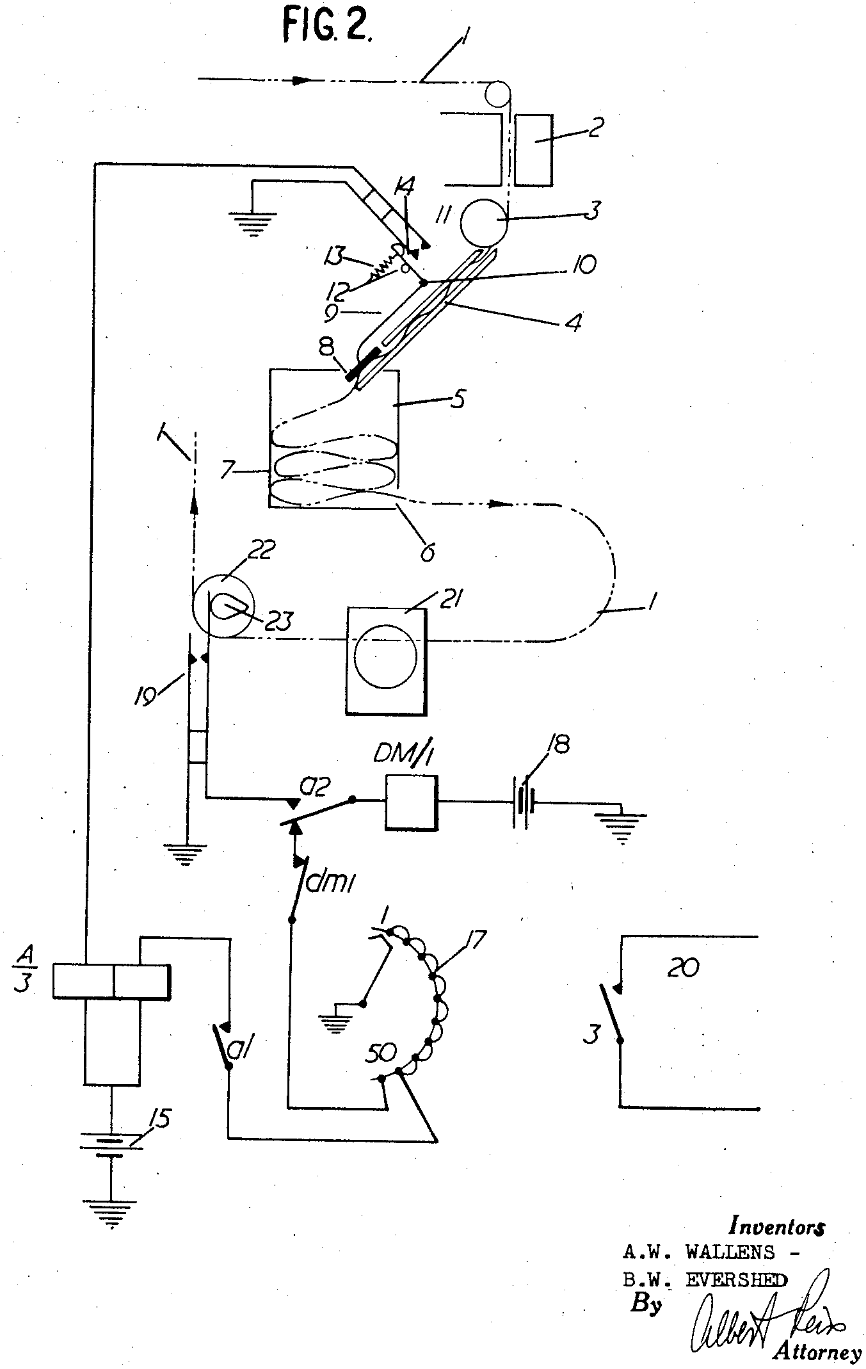

The invention will be better understood from the following detailed description taken in conjunction with the accompanying drawings, in which:

Fig. 1 shows one embodiment of a tape storage system according to the present invention, and Fig. 2 shows another embodiment of a tape storage system according to the present invention.

Referring first to Fig. 1 there is shown a tape 1 which is fed through the punch block 2 of a reperforator where it is perforated with code combinations of perforations in accordance with received signals. It is then fed via the tape sprocket 3 of the reperforator directly into a guide 4. The guide 4 leads into the storage box or container 5 in which the tape 1 is stored. The storage box 5 has an exit aperture 6 through which tape 1 may be withdrawn to be fed to a transmitter (not shown). The tape 1 within the storage box 5 forms itself into loops such as 7 as it is fed in from the reperforator.

A portion 8 at the exit end of the guide 4 is separate from the main portions of the guide 4. While the main portions of the guide 4 are mounted in a fixed position, the portion 8 is mounted on an arm 9 which is pivoted at 10. Integral with arm 9 and also pivoted at 10 is an arm 11 which is spring-urged against stop 12 by a spring 13.

As the tape 1 is fed through the guide 4 to the storage box 5, it will drop down in a layer across the width of the box 5. When it reaches a side wall of the box 5, the tape has to fold over on itself to form a fresh loop 7. As it does this it presses back up against the lower end of the upper surface of the guide 4, that is against the portion 8, and adopts a sinuous form along the length of the guide 4. While the storage box 5 is comparatively empty, the pressure exerted on the portion 8 during the formation of a fresh loop 7 is very small, but, as the box 5 becomes fuller, so this pressure on portion 8 increases.

The spring 13 is arranged to have a tension such that it does not yield until the pressure on portion 8 reaches a value necessary to the formation of a fresh loop when the storage box 5 is, for example, more than 50% full. The storage box is said to be full when the sprocket holes tear at the feed sprocket of the reperforator and no further tape will feed into the storage box.

When spring 13 yields, both the arms 9 and 11 move in a clockwise direction about pivot 10 and arm 11 operates to close electrical contacts 14, thereby completing a circuit through battery 15 and lamp 16. Once a fresh loop 7 has been formed in the tape in the storage box 5, the pressure exerted by the tape on portion 8 as it is fed into the box 5 falls again and spring 13 returns the arms 9 and 11 in an anticlockwise direction about pivot 10 to allow contacts 14 to open again. The contacts 14 will, however, be closed each time a fresh loop 7 is formed, so that the lamp 16 will flicker on and off as long as more tape is fed into the storage box 5.

The lamp 16 will therefore give an indication to an operator when tape is being fed to a storage box which is more than 50% full.

Indicators of this type have particular application in a tape relay system where messages are received at an incoming storage unit, perforated on tape and then transmitted across the office to the appropriate outgoing storage units, where they are again perforated on tape and stored before being finally re-transmitted. At an incoming storage unit, where there is an operator in attendance and it is not permissible to interfere with the incoming traffic, an indicator such as that described above with reference to Fig. 1 is particularly suitable.

The operator will take action in response to the alarm indication to cause tape to be withdrawn from the storage box by the transmitter and the information stored therein will be transmitted to outgoing storage units or deferred traffic storage units if necessary.

In some cases, however, it is permissible to interrupt the incoming traffic. For example, when the storage box at an outgoing storage unit of a tape relay system is approaching maximum capacity, the transmission of a further message to that outgoing storage unit can be prevented.

Fig. 2 shows an embodiment of the invention in which the transmission of a further message to the outgoing storage unit is prevented automatically when the storage box at that outgoing storage unit approaches maximum capacity, and in which the removal from the storage box of a predetermined quantity of tape automatically allows further messages to be received.

The parts shown in Fig. 2 which correspond to parts shown in Fig. 1 have been designated with the same reference numerals. The tape 1 is fed into a storage box 5 and the contacts 14 are closed in the same way as was described with reference to Fig. 1. In the arrangement of Fig. 2, however, the contacts 14 are arranged to complete a circuit through the battery 15 and the operating winding of a relay A/3. The relay A/3 has a first contact *a*1 which operates to complete a circuit through the battery 15, the holding winding of relay A/3 and uniselector 17 in position 1. The relay A/3 is therefore held operated after the contacts 14 have been closed once. The closing of the second contact *a*2 of the relay A/3 prepares a circuit through battery 18, uniselector drive magnet DM/1, and contacts 19 for operation. The third contact *a*3 of relay A/3 completes an incoming busy circuit 20, so that a busy condition is applied to a circuit (not shown) which controls the messages being fed into the reperforator at the outgoing storage unit in well known manner. When the end of the message being received at that time is reached, the controlling circuit will not allow any more messages to be accepted until the busy condition is removed.

When a message is transmitted from the outgoing storage unit, tape 1 is withdrawn from the storage box 5, fed through a transmitter 21 by the transmitter sprocket wheel 22 and away to a tape winder (not shown) on which the used tape is collected. Attached to the shaft of sprocket wheel 22 is a cam 23 arranged to control the contacts 19 so that, as the tape 1 is fed from the storage box 5 through the transmitter 21, the contacts 19 are closed once in each revolution of the sprocket wheel 22.

When contacts 19 are closed, the uniselector drive magnet DM/1 is energised, provided that relay A/3 is operated. The uniselector 17, which starts in position 1, is therefore stepped one position for each revolution of the sprocket wheel 22. When the uniselector 17 is stepped, in the case shown, to position 50, the holding circuit of relay A/3 is broken, and contacts *a*1, *a*2, *a*3, all move back to the unoperated position. The incoming busy circuit 20 is therefore broken.

Sufficient tape will by this time have been removed from the storage box 5 for the pressure on portion 8 to be reduced. Contacts 14 will therefore be open and acceptance of further messages by the reperforator will be again allowed.

When the contact *a*2 returns to the unoperated condition, the uniselector 17 is in position 50 and a circuit is completed through battery 18 and the uniselector drive magnet DM/1. Then, as the interrupter contact *dm*1 opens, the uniselector 17 is stepped to position 1 again.

In an arrangement including a transmitter which is equipped to recognise the end of a message, this recognition may be used to release the busy condition instead of the measurement of a length of tape by sprocket-driven contacts as described above.

While the principles of the invention have been described above in connection with specific embodiments, and particular modifications thereof, it is to be clearly understood that this description is made only by way of example and not as a limitation on the scope of the invention.

What we claim is:

1. In a tape storage system for storing a predetermined amount of relatively stiff flexible tape, a storage container, tape drive apparatus, guide means positioned in close proximity to said drive apparatus and said container, means responsive to the operation of said drive apparatus for applying a forward force to the tape to continuously move it into the container through the said guide means and to form loops of tape in the container, the back force generated as a result of the formation of said loops being transmitted to said guide means through said tape, the amount of back force being transmitted to the guide means corresponding to the amount of tape stored in the container, and detecting means in said guide means for detecting a back force of a predetermined amount for providing an indication of the corresponding amount of tape stored.

2. In a tape storage system according to claim 1, adjustable means for varying the amount of back force required to provide the said indication.

3. A tape storage system as set forth in claim 1 wherein the said detecting means includes a pivotable section of said guide means which is rotated in response to back force applied to said tape and wherein contact means associated with said pivotable section is operated in response to rotation of said section.

4. In a tape storage system according to claim 1, means controlled by the operation of said detecting means for disabling the said drive apparatus, means for removing stored tape from said container, and means controlled by the removal of a predetermined amount of said tape for controlling the said means for disabling to cause reoperation of the said drive apparatus.

References Cited in the file of this patent

UNITED STATES PATENTS

| | | |
|---|---|---|
| 1,071,608 | Dear et al. | Aug. 26, 1913 |
| 2,259,517 | Drenkard | Oct. 21, 1941 |